US008099279B2

(12) United States Patent
Acero et al.

(10) Patent No.: US 8,099,279 B2
(45) Date of Patent: *Jan. 17, 2012

(54) INTERACTIVE CLUSTERING METHOD FOR IDENTIFYING PROBLEMS IN SPEECH APPLICATIONS

(75) Inventors: Alejandro Acero, Bellevue, WA (US); Dong Yu, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 867 days.

This patent is subject to a terminal disclaimer.

(21) Appl. No.: 11/054,301

(22) Filed: Feb. 9, 2005

(65) Prior Publication Data

US 2006/0178884 A1    Aug. 10, 2006

(51) Int. Cl.
*G10L 19/00* (2006.01)
(52) U.S. Cl. ........ 704/251; 704/231; 704/246; 704/247; 704/252
(58) Field of Classification Search .................. None
See application file for complete search history.

(56) References Cited

U.S. PATENT DOCUMENTS

| | | | |
|---|---|---|---|
| 4,881,252 A * | 11/1989 | Jones et al. | 379/38 |
| 6,192,343 B1 | 2/2001 | Morgan et al. | |
| 6,219,643 B1 * | 4/2001 | Cohen et al. | 704/257 |
| 6,510,411 B1 | 1/2003 | Norton et al. | |
| 6,895,083 B1 * | 5/2005 | Bers et al. | 379/88.01 |
| 7,024,368 B1 | 4/2006 | Matheson | |
| 7,026,389 B2 * | 4/2006 | Winterowd | 524/497 |
| 7,062,028 B2 * | 6/2006 | Holt et al. | 379/211.03 |
| 7,092,888 B1 * | 8/2006 | McCarthy et al. | 704/277 |
| 7,191,133 B1 * | 3/2007 | Pettay | 704/270 |
| 7,231,019 B2 * | 6/2007 | Pascovici | 379/88.02 |
| 7,363,212 B2 * | 4/2008 | Erhart et al. | 704/2 |
| 7,643,995 B2 | 1/2010 | Acero et al. | |
| 2002/0138265 A1 | 9/2002 | Stevens et al. | |
| 2003/0091163 A1 * | 5/2003 | Attwater et al. | 379/88.01 |
| 2004/0068406 A1 | 4/2004 | Maekawa et al. | |

(Continued)

FOREIGN PATENT DOCUMENTS

WO    0055843 A1    9/2000

OTHER PUBLICATIONS

Banfield et al., J. D., "Model-Based Gaussian and Non-Gaussian Clustering", Biometrics, vol. 49, No. 3, pp. 803-821, Sep. 1993.

(Continued)

*Primary Examiner* — Leonard Saint Cyr
(74) *Attorney, Agent, or Firm* — Joseph R. Kelly; Westman, Champlin & Kelly, P.A.

(57) ABSTRACT

A method of aiding a speech recognition program developer by grouping calls passing through an identified question-answer (QA) state or transition into clusters based on causes of problems associated with the calls is provided. The method includes determining a number of clusters into which a plurality of calls will be grouped. Then, the plurality of calls is at least partially randomly assigned to the different clusters. Model parameters are estimated using clustering information based upon the assignment of the plurality of calls to the different clusters. Individual probabilities are calculated for each of the plurality of calls using the estimated model parameters. The individual probabilities are indicative of a likelihood that the corresponding call belongs to a particular cluster. The plurality of calls is then re-assigned to the different clusters based upon the calculated probabilities. These steps are then repeated until the grouping of the plurality of calls achieves a desired stability.

18 Claims, 10 Drawing Sheets

U.S. PATENT DOCUMENTS

2005/0129214 A1* 6/2005 Tyagarajan et al. ...... 379/265.04

OTHER PUBLICATIONS

Basu et al., S., "Semi-supervised Clustering by Seeding", Proceedings of the 19th International Conference on Machine Learning (ICML-2002), Sydney, Australia, pp. 19-26, Jul. 2002.

Blum et al., A., "Learning from Labeled and Unlabeled Data using Graph Mincuts", Proceedings of the 18th International Conference on Machine Learning (ICML-2001), pp. 19-26, 2001.

Blum et al., A., "Combining Labeled and Unlabeled Data with Co-Training", The 11th Annual Conference on Computational Learning Theory, pp. 92-100, 1998.

Cadez et al., I., "Model-Based Clustering and Visualization of Navigation Patterns on a Web Site", Data Mining and Knowledge Discovery, vol. 7, pp. 399-424, 2003.

Castelli et al., V., "The Relative Value of Labeled and Unlabeled Samples in Pattern Recognition with an Unknown Mixing Parameter", IEEE Transactions on Information Theory, vol. 42, No. 6, pp. 2102-2117, Nov. 1996.

Cohn et al., D., "Semi-supervised Clustering with User Feedback", Technical Report TR2003-1892, Cornell University, 2003.

Cozman et al., F. G., "Semi-Supervised Learning of Mixture Models", Proceedings of the Twentieth International Conference on Machine Learning (ICML-2003), Washington, D.C., pp. 106-113, 2003.

Cheeseman et al., P., "Bayesian Classification (AutoClass): Theory and Results", Advances in Knowledge Discovery and Data Mining, AAAI Press, Menlo Park, California, edited by U. M. Fayyad, G. Piatetsky-Shapiro, P. Smyth and R. Uthurusamy, pp. 153-180, 1995.

Dempster et al., A. P., "Maximum Likelihood from Incomplete Data via the EM Algorithm", Journal of the Royal Statistical Society, vol. 39, No. 1, 1977.

Nigam et al., K., "Text Classification from Labeled and Unlabeled Documents using EM" Machine Learning, vol. 39, Nos. 2/3, pp. 103-134, May/Jun. 2000.

Fraley et al., C., "How Many Clusters? Which Clustering Method? Answers Via Model-Based Cluster Analysis", The Computer Journal, vol. 41, No. 8, pp. 578-588, 1998.

Guerrero-Curieses et al., A., "An Entropy Minimization Principle for Semi-Supervised Terrain Classification", Proceedings 2000 International Conference on Image Processing, vol. 3, No. 3, pp. 312-315, Sep. 2000.

Kamvar et al., S. D., "Interpreting and Extending Classical Agglomerative Clustering Algorithms using a Model-Based Approach", Proceedings of the Nineteenth International Conference on Machine Learning (ICML-2002).

Smyth, P., "Probabilistic Model-Based Clustering of Multivariate and Sequential Data", In Proceedings of Seventh International Workshop on Artificial Intelligence and Statistics, San Francisco, California, pp. 299-304, 1999.

Wagstaff et al., K., "Constrained K-means Clustering with Background Knowledge", Proceedings of the Eighteenth International Conferences on Machine Learning (ICML-2001), pp. 577-584, 2001.

Zeng et al., H., "CBC: Clustering Based Text Classification Requiring Minimal Labeled Data", Proceedings of IEEE International Conference on Data Mining, Melbourne, Florida, 2003.

Zhong, S., "Probabilistic Model-based Clustering of Complex Data", doctoral dissertation, Department of Electrical and Computer Engineering, The University of Texas at Austin, Aug. 2003.

Zhong, S., "Semi-Supervised Model-based Document Clustering: A Comparative Study", Department of Computer Science and Engineering, Florida Atlantic University, 2004.

U.S. Appl. No. 11/054,096, Office Action mailed Apr. 8, 2009.
U.S. Appl. No. 11/054,096, Office Action mailed Aug. 5, 2008.

* cited by examiner

TABLE I
CTD CONSTRUCTION ALGORITHM

```
For each call Cn {
  For each arc sequentially visited by Cn {
    If the start state of the arc is not in the CTD { add it. }
    If the end state of the arc is not in the CTD { add it. }
    If the arc is not in the CTD {add it. }
    If the call Cn is not associated with the arc
        { add it. }
    Else
        { update the timestamp of the call. }
  }
}
```

TABLE 2
IC PERFORMANCE EVALUATION (DATA SET 1)

| Approach | Exp Config | PPI | ANL | PDA |
|---|---|---|---|---|
| Brute force | PDA fix | 100% | 115 | 0.00 |
| Sampling | ANL fix | 62.5% | 1.75 | 0.217 |
| | PPI fix | 93.8% | 14.0 | 0.079 |
| IC | 1 | 75% | 1 | 0.124 |
| | 2 | 100% | 2.25 | 0.018 |
| | 3 | 100% | 1.5 | 0.004 |
| | 4 | 100%1 | 1.75 | 0.001 |
| | Average | 93.8% | 1.63 | 0.037 |

TABLE 3
IC PERFORMANCE EVALUATION (DATA SET 2)

| Approach | Exp Config | PPI | ANL | PDA |
|---|---|---|---|---|
| Brute force | PDA fix | 100% | 224 | 0.000 |
| Sampling | ANL fix | 62.5% | 1.75 | 0.325 |
| | PPI fix | 93.8% | 20.8 | 0.063 |
| IC | 1 | 100% | 2 | 0.001 |
| | 2 | 75% | 1.5 | 0.116 |
| | 3 | 100% | 1.25 | 0.000 |
| | 4 | 100% | 1.75 | 0.000 |
| | Average | 93.8% | 1.63 | 0.029 |

FIG. 9

INTERACTIVE CLUSTERING METHOD FOR IDENTIFYING PROBLEMS IN SPEECH APPLICATIONS

CROSS-REFERENCE TO RELATED APPLICATIONS

Reference is hereby made to the following co-pending and commonly assigned patent application: U.S. application Ser. No. 11/054,096, filed Feb. 9, 2005, entitled "METHOD OF AUTOMATICALLY RANKING SPEECH DIALOG STATES AND TRANSITIONS TO AID IN PERFORMANCE ANALYSIS IN SPEECH APPLICATIONS", which is hereby incorporated by reference in its entirety.

BACKGROUND OF THE INVENTION

The present invention generally pertains to speech recognition applications and systems. More specifically, the present invention pertains to methods of identifying and analyzing performance problems during development of speech recognition applications.

Although great progress has been made in speech recognition technology during the past two decades, adoption of speech technology has not gone as smoothly as might be desired. This is evidenced by the relatively limited deployment of speech applications. The main barrier to wider adoption of speech recognition technology stems from the cost incurred in developing the speech applications. A typical speech application includes application logic, dialog, one or more grammars, a speech recognition engine, etc. Since it is unlikely that the system will be available right at the very beginning (i.e., without significant development), constructing a quality speech application usually involves four steps, namely, (1) design; (2) prototyping; (3) evaluation and tuning; and (4) deployment. Typically, the prototyping step and the evaluation and tuning step are performed iteratively, fine tuning the speech application through each iteration to improve performance.

Among these four steps, evaluation and tuning during test and pilot stages is one of the most important phases and usually costs most. The tuning phase can take many months and requires a team of developers, testers, and speech technology experts.

Significant efforts have been directed toward the goal of reducing the total cost needed to develop and deploy speech applications. For example, a series of development tools have recently been released by companies working in speech recognition. The development tools significantly improved the development process. However, some critical functionality is not available in these tools. For instance, speech application authors usually don't know what to do when the success rate of their application is not satisfactory, even though they have access to large quantities of application logs. It would therefore be very valuable to automatically (or semi-automatically) determine what callers are struggling with, or which parts of their application need the most work.

The present invention provides solutions to one or more of the above-described problems and/or provides other advantages over the prior art.

SUMMARY OF THE INVENTION

A method of aiding a speech recognition program developer by grouping calls passing through an identified question-answer (QA) state or transition into clusters based on causes of problems associated with the calls is provided. The method includes determining a number of clusters into which a plurality of calls will be grouped. Then, the plurality of calls is at least partially randomly assigned to the different clusters. Model parameters are estimated using clustering information based upon the assignment of the plurality of calls to the different clusters. Individual probabilities are calculated for each of the plurality of calls using the estimated model parameters. The individual probabilities are indicative of a likelihood that the corresponding call belongs to a particular cluster. The plurality of calls is then re-assigned to the different clusters based upon the calculated probabilities. These steps are then repeated until the grouping of the plurality of calls achieves a desired stability.

Other features and benefits that characterize embodiments of the present invention will be apparent upon reading the following detailed description and review of the associated drawings.

BRIEF DESCRIPTION OF THE DRAWINGS

FIG. 5-1 is a block diagram illustrating a system or tool in accordance with an embodiment of the present invention.

FIG. 5-2 is a flow diagram illustrating a method in accordance with the present invention.

FIG. 6-1 is a diagrammatic illustration of an example of an initial interactive clustering (IC) step in which all calls are clustered into one unlabelled class.

FIG. 6-2 is a diagrammatic illustration of an example of a later interactive clustering (IC) step in which, after six calls are labeled, calls are automatically clustered into labeled classes and an unlabeled class.

FIG. 9 includes two tables illustrating performance evaluation data.

DETAILED DESCRIPTION OF ILLUSTRATIVE EMBODIMENTS

1. Exemplary Environments

Various aspects of the present invention pertain to methods and apparatus for identifying problems in speech recognition applications. The methods and apparatus are useful in reducing the speech recognition application development time and to enhance performance of the applications. Both of these results can lead to reduced development costs and wider use of speech recognition technology.

Examples of well-known computing systems, environments, and/or configurations that may be suitable for use with the invention include, but are not in any way limited to, personal computers, server computers, hand-held or laptop devices, multiprocessor systems, microprocessor-based systems, and set top boxes. Embodiments of the present invention can be implemented in the development of a wide variety of speech recognition applications, for example including voice-dialing systems, call routing systems, voice messaging systems, order management systems, or any application using dialog turns (i.e., question-answer or "QA" states and transitions) and a speech recognition engine to recognize speech from a user to guide the user to a desired result. These are simply examples of systems with which the present invention can be used to improve the development process.

Prior to discussing embodiments of the present invention in detail, exemplary computing environments within which the embodiments and their associated systems can be implemented will be discussed.

Figure 1:
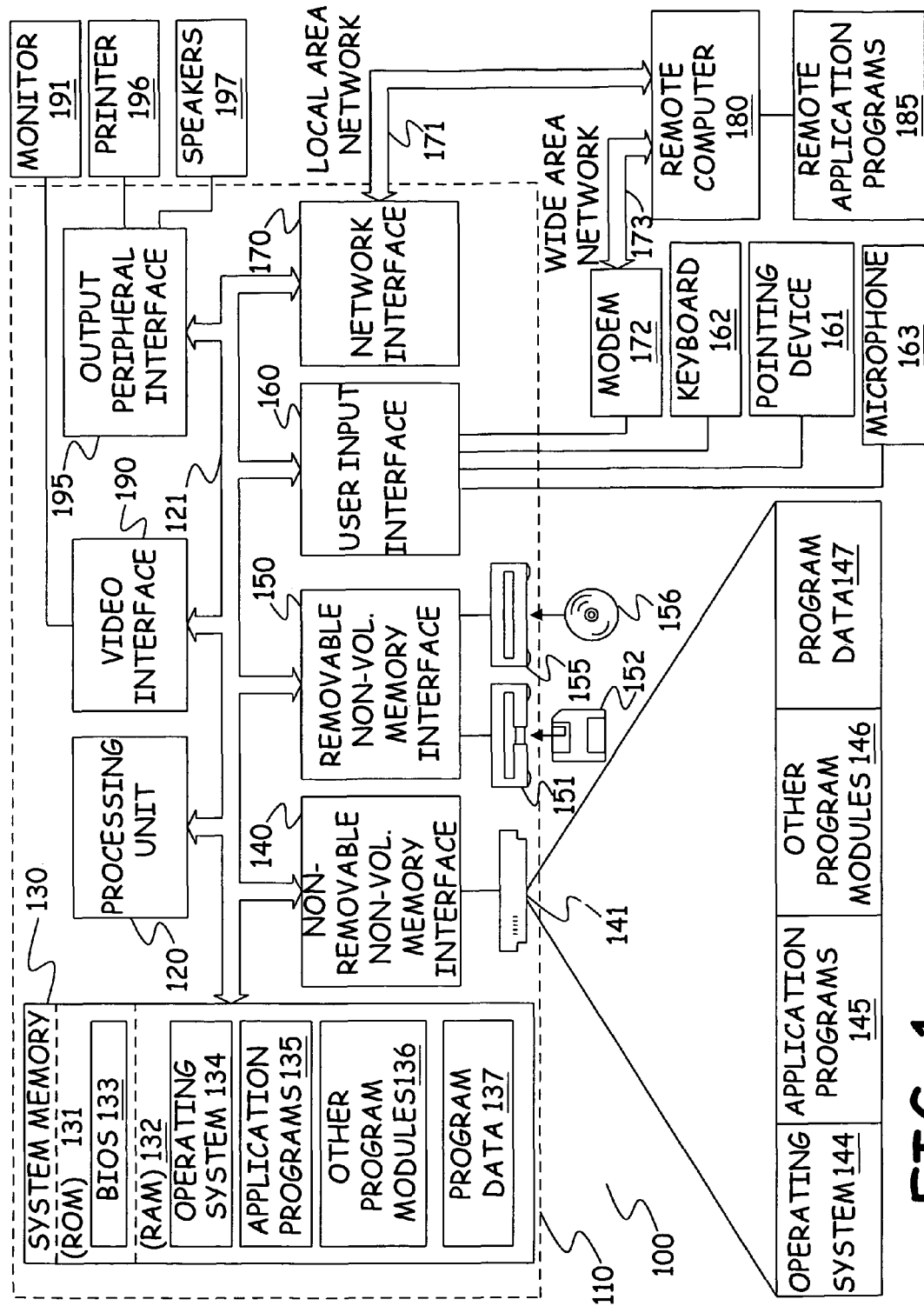
FIG. 1 is a block diagram representation of a general computing environment in which illustrative embodiments of the present invention may be practiced.

FIG. 1 illustrates an example of a suitable computing environment 100 within which embodiments of the present invention and their associated systems may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of illustrated components.

The present invention is operational with numerous other general purpose or special purpose computing consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices. Tasks performed by the programs and modules are described below and with the aid of figures. Those skilled in the art can implement the description and figures as processor executable instructions, which can be written on any form of a computer readable media.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 1. However, the present invention can be alternatively carried out on a server, a computer devoted to message handling, a distributed system in which different portions of the present invention are carried out on different parts of the distributed computing system, etc.

2. Speech Application Problem Identification Methods and System

I. Introduction

The present invention includes methods, apparatus and systems which can be used to reduce the time and efforts needed by developers to identify problems in their applications during the evaluation and tuning phase of speech application development. It is assumed that developers have access to the speech application logs containing data on Question Answer (QA) states and transitions. The present invention can then be used to aid developers by mining and analyzing the log data. While in embodiments of the present invention the logs are referred to as "call logs", inferring for example that the speech recognition application can be part of a telephone based system (for example a voice dialing or call center application), the invention is not limited to this type of application or to use with this type of logs. Use of the phrase "call logs" is intended to represent logs pertaining to telephone calls interacting with the speech recognition application, as well as any logs of interaction ("calls") between a user and a speech recognition application, whether telephone based or not.

The approach used in some embodiments of the invention includes two primary steps. In the first step, calls are clustered based on QA states and transitions, and important QA states and transitions are identified based on a new criterion referred to here as Arc Cut Gain in Success Rate (ACGSR). The invention also includes an algorithm or method to estimate the ACGSR by analyzing the Call Transition Diagram (CTD) automatically inferred from the speech application log data. In the second step, calls associated with important QA transitions are clustered through a new approach referred to here as Interactive Clustering (IC). The purpose of IC is to automatically cluster calls that are similar to those labeled by the users, so that users can focus on checking those unlabeled calls and identifying new problems. Experiments on an auto-attendant application named "MS Connect" show that the approaches of the present invention can dramatically reduce the time and efforts needed to identify problems in speech applications.

The above concepts and methods are described below as follows: First, the step or method of clustering calls based on QA states and transitions, and ranking QA transitions, is described. Specifically, the concept of ACGSR for measuring the importance of the QA transitions is introduced, and an algorithm to estimate ACGSR is provided. Then, the step or method of identifying problems in the calls associated with those important QA transitions is illustrated. The concept of IC is described, and semi-supervised mixture model based algorithms for it are derived/disclosed. Finally, the performance evaluation of the algorithms on MS Connect log is reported. It will be shown that the present invention does significantly reduce the time and efforts needed by developers to identify problems in their applications.

II. Cluster and Rank QA Transitions

In this section, the step or method of clustering calls based on QA states and transitions, and ranking QA transitions based on ACGSR, is described. First, the concept of a call transition diagram (CTD) is introduced, as is a way to automatically construct a CTD from speech application logs. The concept of ACGSR is then described, and an ACGSR estimation algorithm is derived/disclosed. After that, issues related to presenting the ranking results are discussed. It is emphasized that the ultimate goal of performance evaluation and tuning is to improve the success rate of a speech application.

Definition 1: The success rate r is defined as the percentage of successful calls, i.e., calls that fulfilled their tasks, over all calls placed: r=S/N.

Here S is the number of calls which fulfilled their tasks and N is the total number of calls placed. Fulfillment of a task is defined by the corresponding speech application(s), and for example can be calls transferred in an auto-attendant application, or balance checked in an automatic support application.

A. Call Transition Diagram and its Construction

Definition 2: A Call Transition Diagram (CTD) is a 3-tuple CTD=(Q,A,T), where:

Q is a finite set of states $Q=\{q_i | i=1, \ldots, I\}$;

A is a finite set of arcs that $A=\{a_{ij}\} \subseteq (Q \times Q)$;

T is the set of calls passing through the arcs: T: A→$S_C$, where C is the set of all calls placed C={$c_n$|n=1, ..., N} and $S_C$ is the superset of the set C.

Note that the CTD differentiates itself from the traditional Call Flow Diagram (CFD) in that the CTD contains the set of the calls passing through each arc. The CTD is also different from the traditional Markov Model description of the Call states. In the Traditional Markov Model description, the number of times a state and/or arc is visited determines the model parameters, while in the CTD the number of distinguished calls visiting each arc is measured. No matter how many times the same call has visited the same arc, it's counted as one call in the CTD. The reason for this difference is that more interest is placed in the successful calls rather than the events.

To make the following discussion easier, $T_{ij}$ is used to represent the set of calls associated with the arc $a_{ij}$, and $t_{ij}=|T_{ij}|$ is used to represent the number of calls in the set. Similarly, $S_{ij}$ is used to represent the set of successful calls associated with the arc $a_{ij}$, and $s_{ij}=|S_{ij}|$ is used to represent the number of successful calls associated with the arc.

Figures 2, 3:
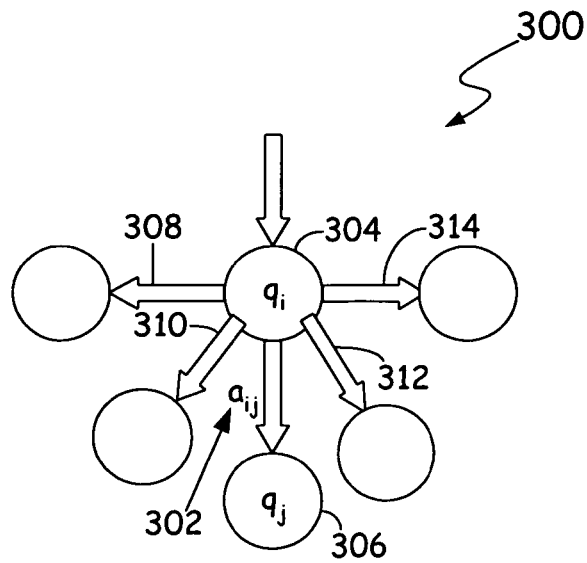
FIG. 2 is a block diagram illustrating an algorithm for constructing a call transition diagram (CTD) from a call log.
FIG. 3 is a diagrammatic illustration of a tree type call-state graph (CSG).

The construction of the CTD from the application logs is straight forward. Table I shown in FIG. 2 summarizes an algorithm for performing such a construction. Note that, during the CTD construction process, calls are clustered based on the QA states and transitions they have visited.

B. ACGSR and its Estimation

Once the CTD is obtained, those QA states and transitions that need the most attention from developers must be identified. One method of identifying these QA states is to list the QA states and transitions based on the local unsuccessful rate. This approach, however, is not optimal since the improvement in the local success rate does not necessary translate into the improvement in the overall success rate. For example, a QA state at the later stage with a high unsuccessful rate may not be worth working on since the total gain achieved by improving this QA state might be very limited. This suggests that a good criterion is critical to the effectiveness of the ranking. As mentioned previously, the criterion proposed here is referred to as ACGSR.

Definition 3: The Arc Cut Gain in Success Rate (ACGSR) is the change of success rate if all calls originally passing through an arc are distributed to other arcs with the same start state (as if the arc is cut from the CTD) given that all other system parameters are unchanged.

ACGSR essentially measures how important it is to reduce the number of calls passing through a specific arc. The higher the ACGSR, the more important it is. Unfortunately, ACGSR is not directly available from the CTD (or logs) and needs to be estimated. In accordance with one embodiment, to estimate ACGSR, it is assumed that calls redirected to other arcs have the same success rate as the calls originally passing through those arcs. If the CTD is a tree (with no loop and no merge) as represented in the call-state graph (CSG) 300 shown in FIG. 3, ACGSR of arc $a_{ij}$ (designated by reference number 302) between states $q_i$ and $q_j$ (designated by reference numbers 304 and 306, respectively) can be estimated using Equation 1:

$$ACGSR(a_{ij}) = \left[\frac{\sum_{k \neq j} s_{ik}}{\sum_{k \neq j} t_{ik}} \cdot t_{ij} - s_{ij}\right] / N \qquad \text{Equation 1}$$

Defining $t_i$ as the total number of calls passing through the state $q_i$, and $s_i$ as the total number of success calls passing through the state $q_i$, i.e., $$t_i = \sum_k t_{ik} \qquad \text{Equation 2}$$

$$s_i = \sum_k s_{ik} \qquad \text{Equation 3}$$

Equation 1 thus becomes Equation 4:

$$\begin{aligned}ACGSR(a_{ij}) &= \left[\frac{s_i - s_{ij}}{t_i - t_{ij}} \cdot t_{ij} - s_{ij}\right] / N \qquad \text{Equation 4}\\ &= (s_i \cdot t_{ij} - s_{ij} \cdot t_{ij} - t_i \cdot s_{ij} + t_{ij} \cdot s_{ij}) / [N(t_i - t_{ij})]\\ &= (s_i \cdot t_{ij} - t_i \cdot s_{ij}) / [N(t_i - t_{ij})].\end{aligned}$$

To summarize, for the tree type CTD represented by CSG 300 illustrated in FIG. 3, estimation of the ACGSR of arc $a_{ij}$ is based upon the scenario where calls originally passing through of arc $a_{ij}$ are now redirected to other arcs (such as the arcs designated by reference numbers 308, 310, 312 and 314) whose start state is $q_i$.

When the CTD is not a tree, however, Equation 4 does not hold any more due to the fact that the same call may flow out of a state several times through different arcs. Consider as an example the CTD represented by CSG 325 shown in FIG. 4 having incoming calls 326 entering state $q_i$ (represented by reference number 333) and passing through arcs $a_{ik}$, $a_{ij}$ and $a_{ii}$ (designated by reference numbers 327, 329 and/or 331) in route to states $q_k$ and $q_j$ (designated by reference numbers 335 and 337). This CSG includes loops and merges. Assume that calls 1, 2, and 3 passing through arc $a_{ij}$ are failed and calls 4 and 5 passing through arc $a_{ik}$ are successful. It can be seen that the success rate does not change if the arc $a_{ii}$ is cut since all calls passing though $a_{ii}$ have already been counted in the arcs $a_{ij}$ and $a_{ik}$. However, if the arc $a_{ij}$ is cut, all calls originally failed are now turned into successful calls and a big gain in the success rate is achieved.

Figure 4:
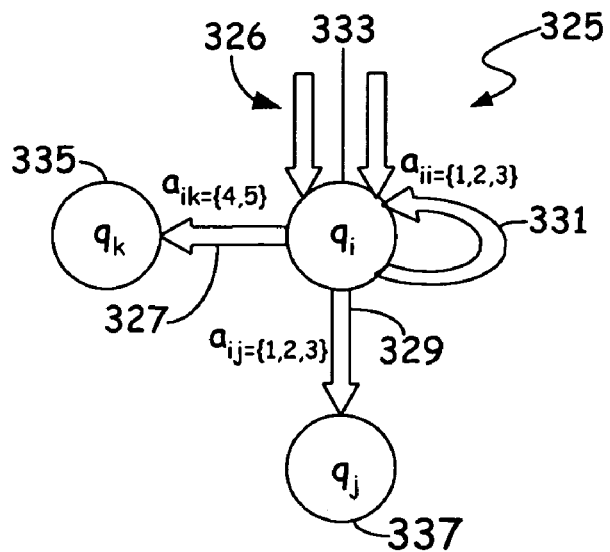
FIG. 4 is a diagrammatic illustration of a CSG with loops and merges.

The example illustrated in FIG. 4 suggests that only the calls flowing out of the start state 333 (no looping back) through the arc should be considered when estimating the ACGSR.

Definition 4: A call loops back to the start state $q_i$ of the arc $a_{ij}$ from the end state $q_j$ if there is a list of arcs {$a_{x_k y_k}$|k=1, ..., K} such that $x_0$=i, $x_{k+1}$=$y_k$, $y_K$=j, and the call passes through them sequentially.

Definition 5: A sunken call of the arc $a_{ij}$ is a call that eventually passes through arc $a_{ij}$ and does not loop back to the start state $q_i$ again.

Theorem 1: A call c passing through the non-stop state $q_i$ is a sunken call of one and only one arc whose start state is $q_i$.

Proof: Since the state is a non-stop state, the call must go out of the state $q_i$ and ends at another state. This means that c is a sunken call of at least one arc whose start state is $q_i$. For the same reason, the call can't be a sunken call of multiple arcs with the same start state.

Definition 6: A timestamp is a number associated with each event. Later events have higher timestamps than the earlier ones. A timestamp can be real time or any number (e.g., event ID) that increases over time. In an example embodiment, time(c,$a_{ij}$) is used to indicate the timestamps of the event that the call c passes through the arc $a_{ij}$. Since each call may pass through the same arc several times, max(time(c,$a_{ij}$)) is used to indicate the latest time c passes through $a_{ij}$.

Theorem 2: A call c associated with arc $a_{ij}$ is a sunken call of $a_{ij}$ if and only if max(time(c,$a_{ij}$))>max(time(c,$a_{ki}$))∀k Proof: If call c is a sunken call, then the call eventually flows out through arc $a_{ij}$ and does not loop back again. This means that later (higher timestamp) events that are associated with call c do not occur in all arcs whose end state is $q_i$.

Contradictory Proof: If call c is not a sunken call, then there is a list of arcs {$a_{x_k y_k}$|k=1, ..., K} such that $x_0$=i, $x_{k+1}$=$y_k$, $y_K$=j, and the call passes through them sequentially. Referring to Equation 5, this means:

$$\max(\text{time}(c, a_{ij})) < \text{time}(c, a_{jy_1})$$
$$< \text{time}(c, a_{y_1 y_2})$$
$$< \ldots$$
$$< \text{time}(c, a_{y_K i})$$
$$\leq \max(\text{time}(c, a_{y_K i})).$$

Equation 5

The final algorithm of ACGSR estimation can be obtained by redefining $T_{ij}$ (recall from above that $t_{ij}$=|$T_{ij}$|) as the set of sunken calls of the arc $a_{ij}$ in Equation 5. Then, Equation 4 still holds for calculation of ACGSR.

C. Present Ranking Results to the Users

To present the result to developers, arcs are sorted on the estimated ACGSR in descending order. The higher the ACGSR for an arc or transition, the larger the gain in success rate which can be achieved by improving the QA state and transition. In addition, two other issues should be considered:

First, developers are interested in knowing how they may improve the system. For this reason, those arcs with negative ACGSR are not informative to them and should not be displayed.

Second, developers cannot manage to reduce the number of calls passing through some arcs even though those arcs may have large ACGSR values. For example, an application may have a menu for the callers to select from. Transitions to any state associated with an item in the menu should not be cut. Two solutions to this problem are provided: Developers can either mark these arcs in the CSG before running the tool or method of the present invention, or select to hide the transition in the displayed report.

The ACGSR estimation algorithm is not only useful in determining the most important QA states and/or transitions for developers to work on, but is also useful in many other areas. For example, by changing the grammar used in a QA state, the call flow would diverge from the original path. The ACGSR estimation algorithm can be used to estimate the total success rate gain after the grammar change without running the updated application.

D. General System and Method

Figures 1, 5:
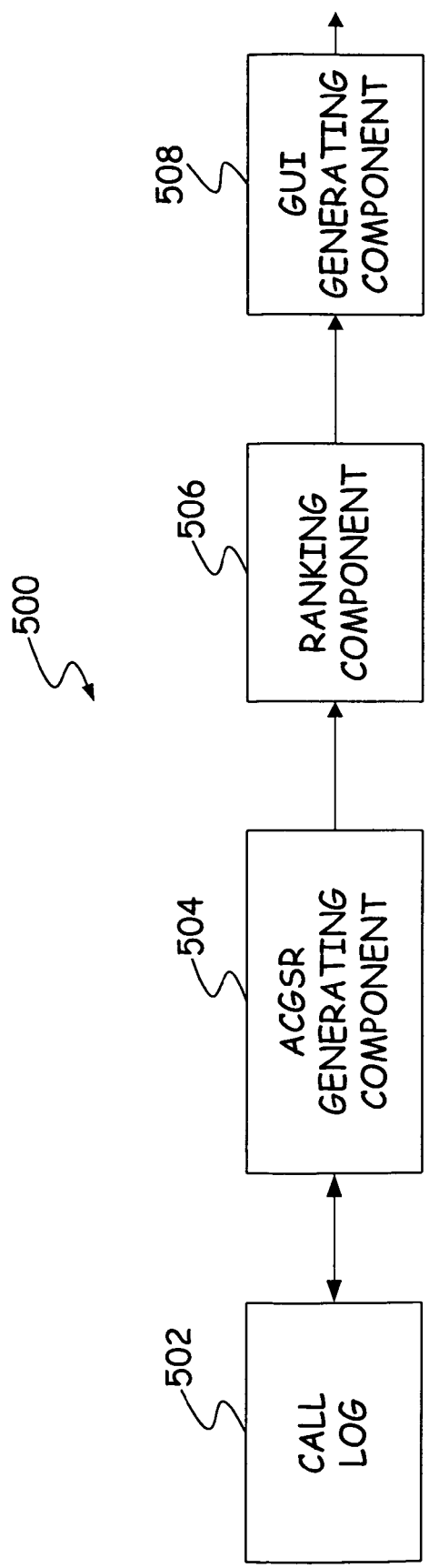
Figures 2, 5:
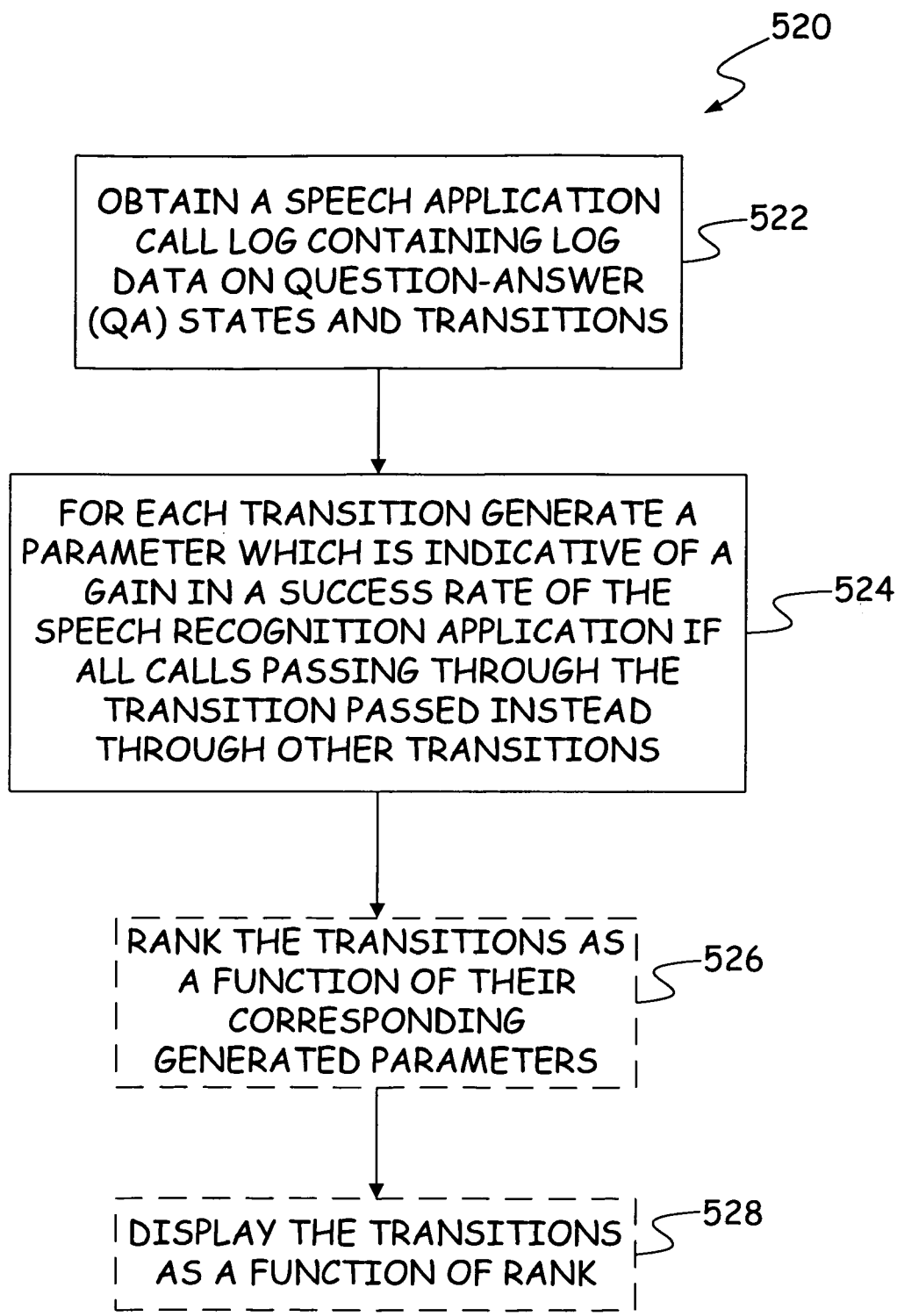
Figures 2, 6:
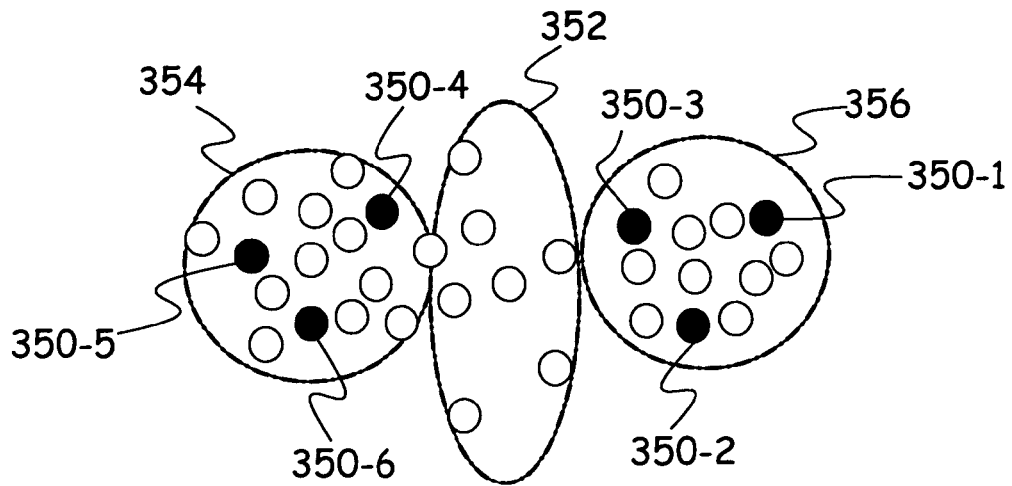

FIG. 5-1 is a block diagram illustrating general system 500 configured to implement the methods of the present invention described above. System 500 includes an ACGSR generating component 504 configured to implement one or more of the above-described methods to generate the ACGSR for transitions or arcs using data in call log 502 pertaining to question-answer (QA) states and transitions. In some embodiments, component 504 can also generate call transition diagrams using, for example, the algorithm shown in FIG. 2. Also, in other embodiments, component 504 generates parameters other than the ACGSR as described above. However, in exemplary embodiments, at least one of these other parameters would still be indicative of a gain in the success rate of the speech recognition application if all calls passing through a transition passed instead through others of a plurality of transitions.

In system 500 illustrated in FIG. 5-1, a ranking component receives the ACGSR scores or other parameters, and ranks the transitions based on these scores or parameters. Then, graphical user interface (GUI) generating component 508 generates a GUI to display the transitions to a user as a function of rank. An example of such a GUI is described below with reference to FIG. 8.

FIG. 5-2 is a flow diagram 520 illustrating in more general terms a method as described above. As can be seen at block 522, the method includes obtaining a speech application call log containing log data on QA states and transitions. At block 524, the method is shown to include the step of generating a parameter (e.g., the ACGSR) for each desired transition which is indicative of the gain in success rate of the application if all calls passing through the transition passed instead through other transitions. Then, the method optionally includes the steps shown at blocks 526 and 528 of ranking or sorting the transitions as a function of their generated parameters, and displaying the transitions as a function of their rank. These steps are optional in some embodiments because it is possible that the generated ACGSRs or other parameters could be used in an automated fashion to correct identified problems without displaying the ranked transitions to a user.

III. Identify Problems Through Interactive Clustering

Once the most important QA states and/or transitions are identified, it is desirable to group calls passing through these arcs into clusters based on the cause of problems. Ideally, the whole process should be automatic. However, there are several difficulties of doing so. First, it is impossible to know all possible causes of the problems, and it is therefore impossible to train classifiers for them before hand. Second, different applications may log different information and it is the additional information that separates one type of problem from another. Third, the parameters in different applications are different and so it's difficult to generate a set of universal classifiers.

For these reasons, the present invention addresses the problem from a different perspective, aiming to reduce the time and efforts needed for the developers to identify problems through Interactive Clustering (IC).

Definition 7: Interactive Clustering (IC) is a clustering process based on semi-supervised clustering technology. During initialization, an IC method or component clusters calls based on prior knowledge such as pre-trained classifiers. If no prior knowledge is available, IC keeps all calls in one cluster or groups them with unsupervised clustering. The developer checks unlabeled calls and labels them (with the cause of the problem, for example). The developer's interaction is used as supervision and/or feedback for IC to adjust and label other calls. This process goes on until all calls are labeled and the developer is satisfied with the labels.

The benefit of IC is clear. With a brute force approach, the developer needs to check, for example, 400 calls associated with a special QA transition to identify most of the problems. During this process, the developer frequently will become frustrated since he/she is checking calls with the same causes again and again. A slightly better approach is random sampling in which it is hard to determine the number of samples needed. A large number of samples typically require lots of redundant work, and a small number of samples typically results in a low probability of finding all problems.

With IC, things are different. Once the developer labels a call, all similar calls are grouped together and labeled. The developer only needs to focus on those unlabeled calls which are usually associated with new causes. The number of calls the developer needs to check overall is thus greatly reduced.

Figures 1, 6:
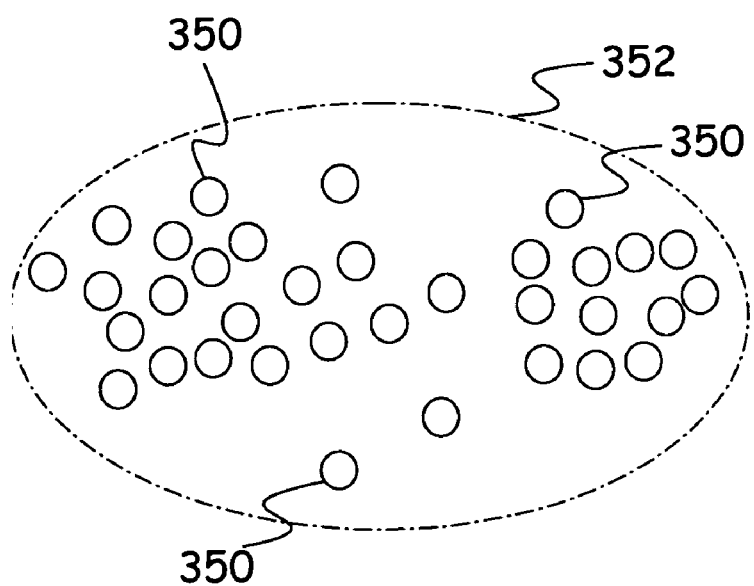

FIGS. 6-1 and 6-2 illustrate an example of the IC method. Originally, all calls 350 (represented as circles) are unlabeled and clustered into one unlabeled class 352 as indicated in FIG. 6-1. After six calls are labeled (represented as darkened circles 350-1 through 350-6), calls are clustered into three classes, two of which are labeled (designated by reference numbers 354 and 356) as indicated in FIG. 6-2. The next call the developer needs to check is from the unlabeled class 352. The main component of IC is a semi-supervised, finite mixture distribution model based, clustering algorithm. One example of a clustering algorithm is provided below. However, other specific clustering algorithms can be used in accordance with embodiments of the present invention.

A. Membership Determination

The goal is to find the best classification for each call in which instances similar to labeled data are labeled accordingly the same or similarly, given a large set of unlabeled data instances and a small set of labeled data instances. For the sake of simplifying the discussion, a variable is denoted by a capitalized token (e.g., $X_i$), and the value of the variable by that same token in lower case (e.g., $x_i$). We use p(x|y) to denote the probability that X=x given Y=y or a probability distribution for X given Y.

The disclosed approach to cluster the whole data set $X=\{x_i | i=1, \ldots, I\}$ into J clusters $C=\{(c_j | j=1, \ldots, J\}$ is mixture distribution model based. Given the model parameters $\lambda$, the probability that the instance $x_i$ belongs to class $c_j$ is:

$$p(c_j | x_i, \lambda) = \frac{p(c_j | \lambda) p(x_i | c_j, \lambda)}{\sum_{j'=1}^{J} p(c_{j'} | \lambda) p(x_i | c_{j'}, \lambda)}, \quad \text{Equation 6}$$

where $p(x_i | c_j, \lambda)$ is the probability that the instance $x_i$ is generated by the class $c_j$ and $p(c_j | \lambda)$ is the prior of different classes. It is assumed that the prior follows Bernoulli distribution, i.e., without knowing the value of the data instance, the probability that it belongs to class $c_j$ is:

$$p(c_j | \lambda) = \pi_j. \quad \text{Equation 7}$$

This means:

$$p(c_j | x_i, \lambda) = \frac{\pi_j p(x_i | c_j, \lambda)}{\sum_{j'=1}^{J} \pi_{j'} p(x_i | c_{j'}, \lambda)} \quad \text{Equation 8}$$

The probabilities $p(c_j | x_i, \lambda)$ are called membership probability. Once these probabilities have been computed, the data instance can either be assigned to the cluster with the highest probability (a hard assignment), or the data instance can be assigned fractionally to the set of clusters according to this distribution (a soft assignment). In exemplary embodiments, when the result is presented to the user, hard assignment is used.

B. Model Parameter Learning

The model parameters are estimated with an Expectation-Maximization (EM) algorithm. The EM algorithm starts with a set of initial values of the parameters, and then iterates between an Expectation (or E) step and a Maximization (or M) step until the parameter values converge to stable values.

Given the model parameters $\lambda$, the probability that the instance $x_i$ is generated by the model is:

$$p(x_i | \lambda) = \sum_{j=1}^{J} p(c_j | \lambda) p(x_i | c_j, \lambda) \quad \text{Equation 9}$$

$$= \sum_{j=1}^{J} \pi_j p(x_i | c_j, \lambda).$$

The probability that all data instances are generated by the model is:

$$p(X | \lambda) = \prod_{i=1}^{I} p(x_i | \lambda) \quad \text{Equation 10}$$

$$= \prod_{i=1}^{I} \sum_{j=1}^{J} \pi_j p(x_i | c_j, \lambda).$$

The posterior probability of model parameter $\lambda$ is:

$$p(\lambda | X) = \frac{p(X | \lambda) p(\lambda)}{p(X)}, \quad \text{Equation 11}$$

where $p(\lambda)$ is the prior distribution of $\lambda$. The maximum a posteriori (MAP) parameter is defined as:

$$\lambda^{MAP} = \operatorname*{argmax}_{\lambda} p(\lambda | X) \quad \text{Equation 12}$$

$$= \operatorname*{argmax}_{\lambda} p(X | \lambda) p(\lambda)$$

$$= \operatorname*{argmax}_{\lambda} (\log p(X | \lambda) + \log p(\lambda)).$$

When used in conjunction with vague or non-informative priors, MAP estimates are smoothed versions of Maximum Likelihood (ML) estimates. In one embodiment, Dirichlet distribution is chosen as the prior for the multinomial distribution with parameters $\phi=(\phi_1, \ldots, \phi_N)$:

$$p(\phi_1, \ldots, \phi_N | \alpha_1, \ldots, \alpha_N) = \frac{\Gamma\left(\sum_{n=1}^{N} \alpha_n\right)}{\prod_{n=1}^{N} \Gamma(\alpha_n)} \prod_{n=1}^{N} \phi_n^{\alpha_n - 1} \quad \text{Equation 13}$$

In one embodiment, $\alpha_1 = \ldots = \alpha_N = 1/N$ is chosen.

Given the current parameters $\lambda$, the new parameters $\lambda'$ is thus estimated to maximize the following function:

$$Q(\lambda', \lambda) = E(p(\lambda' | X)) \quad \text{Equation 14}$$

$$= \sum_{i=1}^{I} \sum_{j=1}^{J} p(c_j | x_i, \lambda) [\log p(X | \lambda') + \log p(\lambda')].$$

Assume that each data instance is an ordered vector of K attribute values $x_i = \{x_{ik} | k=1, \ldots K\}$. It is further assumed that attributes are independent with each other, and therefore:

$$p(x_i | c_j, \lambda) = \Pi_{k=1}^{K} p(x_{ik} | c_j, \lambda) \quad \text{Equation 15}$$

Each attribute can have either nominal values or real values. Multinomial value attributes are modeled with Bernoulli distribution: $\lambda_{jk}=\{q_{jk1}, \ldots, q_{jkL_k}\}$. Real value attributes are modeled with Gaussian distribution: $\lambda_{jk}=\{\mu_{jk},\sigma_{jk}\}$.

Maximizing the Q function with respect to each subset of parameters, the algorithms to update parameters can be obtained.

For prior of class distribution:

$$\pi'_j = \frac{\sum_{i=1}^{I} p(c_j \mid x_i, \lambda) + 1/J}{\sum_{j'=1}^{J} \sum_{i=1}^{I} p(c_{j'} \mid x_i, \lambda) + 1} \qquad \text{Equation 16}$$

For multinomial (Bernoulli distribution) parameters:

$$q'_{jkl} = \frac{\sum_{i=1}^{I} p(c_j \mid x_i, \lambda)\delta(x_{ik}, l) + 1/L_k}{\sum_{j'=1}^{J} \sum_{i=1}^{I} p(c_{j'} \mid x_i, \lambda)\delta(x_{ik}, l) + 1} \qquad \text{Equation 17}$$

where:

$$\delta(x, v) = \begin{cases} 1, & \text{if } x = v \\ 0, & \text{otherwise} \end{cases} \qquad \text{Equation 18}$$

For Gaussian parameters:

$$\mu'_{jk} = \frac{\sum_{i=1}^{I} p(c_j \mid x_i, \lambda)x_{ik}}{\sum_{j'=1}^{J} \sum_{i=1}^{I} p(c_{j'} \mid x_i, \lambda)x_{ik}} \qquad \text{Equation 19}$$

$$\sigma'_{jk} = \frac{\sum_{i=1}^{I} p(c_j \mid x_i, \lambda)(x_{ik} - \mu'_{jk})}{\sum_{j'=1}^{J} \sum_{i=1}^{I} p(c_{j'} \mid x_i, \lambda) + 1} \qquad \text{Equation 20}$$

At the initialization step, random probabilities are assigned to $p(c_j|x_i,\lambda)$ which is used to estimate the initial model.

C. Supervision as Constraint and Feedback

Thus far, the clustering algorithm has been discussed without any labeled data. To use the data instances labeled by users, in some embodiments, the importance of the data instance is artificially boosted to the estimation of the model parameters:

$$p(c_j|x_i,\lambda) = B \cdot \delta(j, \text{Lab}(i)) \qquad \text{Equation 21}$$

where Lab(i) is the label of data point $x_i$, and B is the boost factor. Boost factor B is originally set to 1 and doubles its value every time the converged result does not have labeled data correctly classified. It is straight forward to see that the labeled data is used both as constraint and as feedback in this approach.

Since it is a goal to help users to focus on calls that are not similar to those already labeled, the number of clusters in the clustering algorithm is set to one plus the number of known classes. In other words, J is set to 1 initially and increases by 1 each time a new class is discovered by the user. The IC method or algorithm stops when the number of instances in the unlabeled cluster is zero and the user is satisfied with the labels.

IV. Experiment and Evaluation

Figure 7:
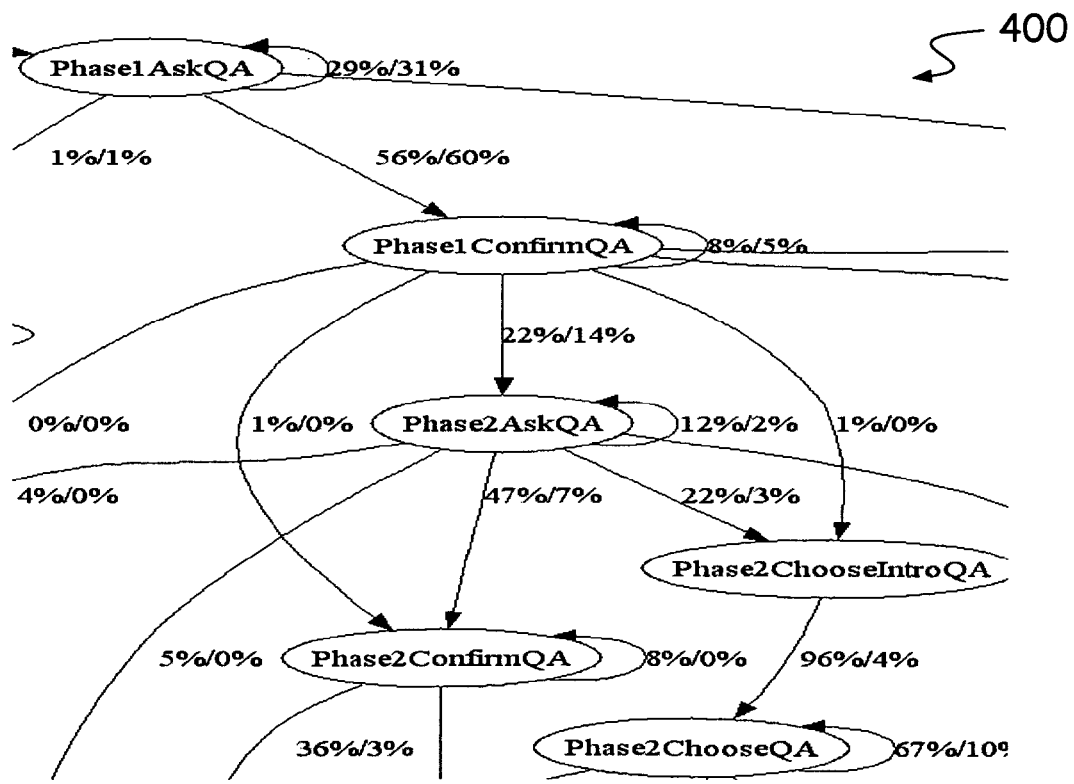
FIG. 7 is a diagrammatic illustration of a call flow graph.

The present invention also includes a tool or component, which implements the above-described approach, for use by developers. This tool has been evaluated on the MS Connect application. MS Connect is an auto-attendant application based on the Microsoft Speech Server platform. It allows users to speak the name of the person they wish to contact and provides them with a variety of messaging options (transfer to office, transfer to cell, or leave a voice recording as an email attachment). When used to evaluate the tool, the MS Connect Service had 33 QA states and 137 transitions, and serves to transfer calls to more than fifty thousand employees of Microsoft Corporation. FIG. 7 illustrates part of the Call Flow Graph 400.

For performance monitoring and tuning purposes, all calls are logged until they are either transferred or hanged up. In the experiments used to evaluate the tool of the present invention, log data collected in June 2004 was used.

Figure 8:
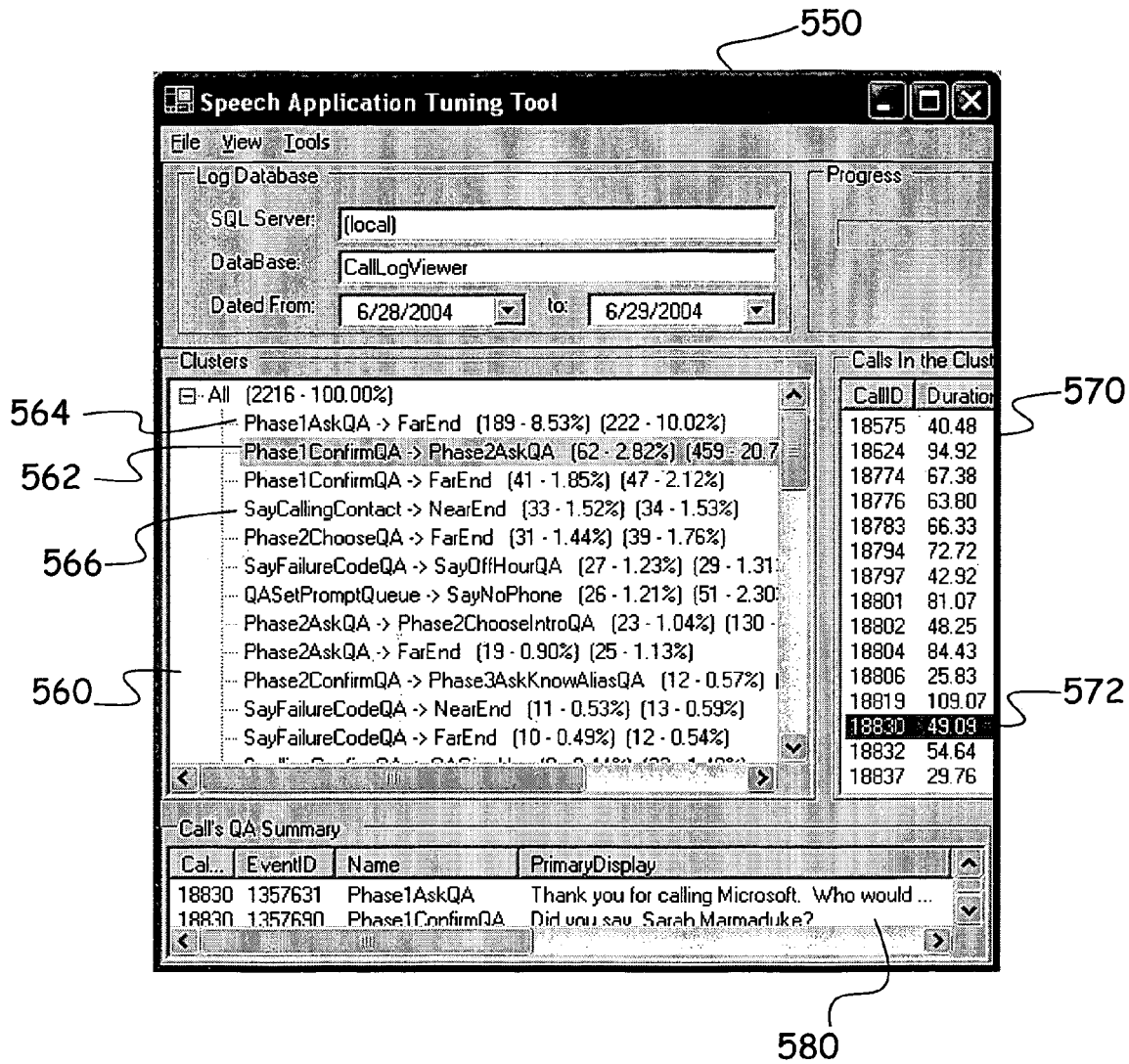
FIG. 8 is a screen shot of a user interface (UI) of a system or tool of the present invention.

FIG. 8 is a screenshot or snapshot illustrating a graphical user interface (GUI) 550 of the tool. In this particular configuration of GUI 550, pane 560 is included, showing QA transitions sorted based on ACGSR scores (from highest ACGSR at the top to lowest ACGSR at the bottom). Each transition shown is followed by two sets of numbers. The first set of numbers indicates the absolute and percentage gain of ACGSR. The second set of numbers indicates the absolute and percentage of calls passing through the arc. The user can select a transition and QA in pane 560 using an input (such as a mouse click) from an input device. In the illustrated example, transition 562 is selected as represented by its highlighting in the display. In pane 570, calls associated with selected transition (in this case transition 562) are displayed. Again, the user can select a call in pane 570. In the illustrated example, call 572 (having Call ID 18830 is selected). In pane 580, the Call QA Summary for a selected call 572 is illustrated.

From FIG. 8, it can be seen that the transition which needs most work (having the highest ACGSR is the transition 564 from Phase1AskQA to FarEnd (hanged up by the caller). From pane 560, it can be seen that more than 10% (or 222) of all calls pass through this transition. As can also be seen in pane 560, if the calls flowing through this transition can be eliminated completely, an absolute 8.5% (or 189 calls) improvement in the success rate can be achieved. This information clearly indicates to the developer that this transition should be worked on, as it will have a significant impact on the performance of the system.

Another interesting finding is that 1.5% of all calls pass through the transition 566 from SayCallingContact to NearEnd (hanged up by the system) which was unexpected. Fixing problems in this transition results in a 1.5% gain in success rate. As can be seen from this experimental data, ACGSR clearly identified those QA states and transitions that developers should pay most attention to.

Evaluating the effectiveness of IC methods requires additional work. Traditionally, clustering algorithms are evaluated with criteria such as confusion matrix, precision, recall, F1 measure, balancing, purity, entropy, and mutual information. These criteria do not fit here since the purpose of IC is to identify all problems as fast as possible. Two obvious criteria are:

Criterion 1: The PPI is the Percentage of Problems Identified over all problems existing under the assumption that the developer can label each call he/she has checked. The best PPI possible is 100%.

Criterion 2: The ANCL (Average Number of Calls Labeled) is the total number of calls labeled manually over all problems identified. The best possible ANCL is 1.

Another criterion is:

Criterion 3: The Problem Distribution Accuracy (PDA) is the accuracy of the number of calls in each class. It is defined as the K-L (Kullback-Leibler) distance between the problem distribution obtained from IC and the true problem distribution:

$$PDA = \sum_i \hat{p}_i \log(\hat{p}_i / p_i),\qquad \text{Equation 22}$$

where $\hat{p}_i$ is the estimated percentage of calls in class i, and $p_i$ is the true percentage of calls in the class i. The best possible PDA is 0. See S. Kullback & R. Leibler, "*On Information and Sufficiency*", Annals of Mathematical Statistics 22, 79-86, 1951.

PDA is related to the final goal of the analysis since it tells developers the order of problems they should work on and the estimated success rate gain after resolving each problem.

We evaluated IC using two sets of data generated from the ACGSR ranking and clustering step. The first set of data contains 459 calls classified into four types of problems with distributions 338, 36, 53, and 32. The second set of data contains 896 calls in four clusters each of which has 706, 69, 67, and 54 calls. The feature set we used in this experiment includes promptID, prompt barged in status, DtmfID, repetition of passing, duration, and engine confidence scores. We ran four independent experiments for each data set and compared IC with the brute force and random sampling approach. Tables 2 and 3 shown in FIG. 9 illustrate the results.

The brute force approach guarantees the correct identification of all problems and distributions. However, it requires checking of 115 calls in data set one and 224 calls in data set two for each problem identified. The random sampling approach gives better results. To compare apples to apples with IC, two sampling configurations were conducted. The first approach is to fix the sampling size (equivalent to ANL fix) and the second approach is to fix the percentage of problems identified (PPI) on average. The result shows that with the same ANL, IC can detect 93.8% of problems in both data sets and the sampling approach can only detect 62.5% of problems. To detect 93.8% of problems, IC requires checking of only 1.63 calls per problem in both data sets, while the sampling approach requires checking 14 calls per problem in data set one and 21 calls per problem in data set two. Furthermore, ANL increases very slowly using IC and much faster using the sampling approach with larger data sets. In both configurations, IC provides more accurate distribution than the sampling approach.

In conclusion, the methods of the present invention have been described in the context of log analysis and its application to speech application problem identification. It has been shown that using ACGSR as the criterion to rank the QA state and transitions, and using IC to help developers find problems quicker, can significantly shorten and improve the development process. Specifically, it has been demonstrated that the present invention can significantly reduce the time and effort required of developers to identify problems in their speech applications.

Figure 10:
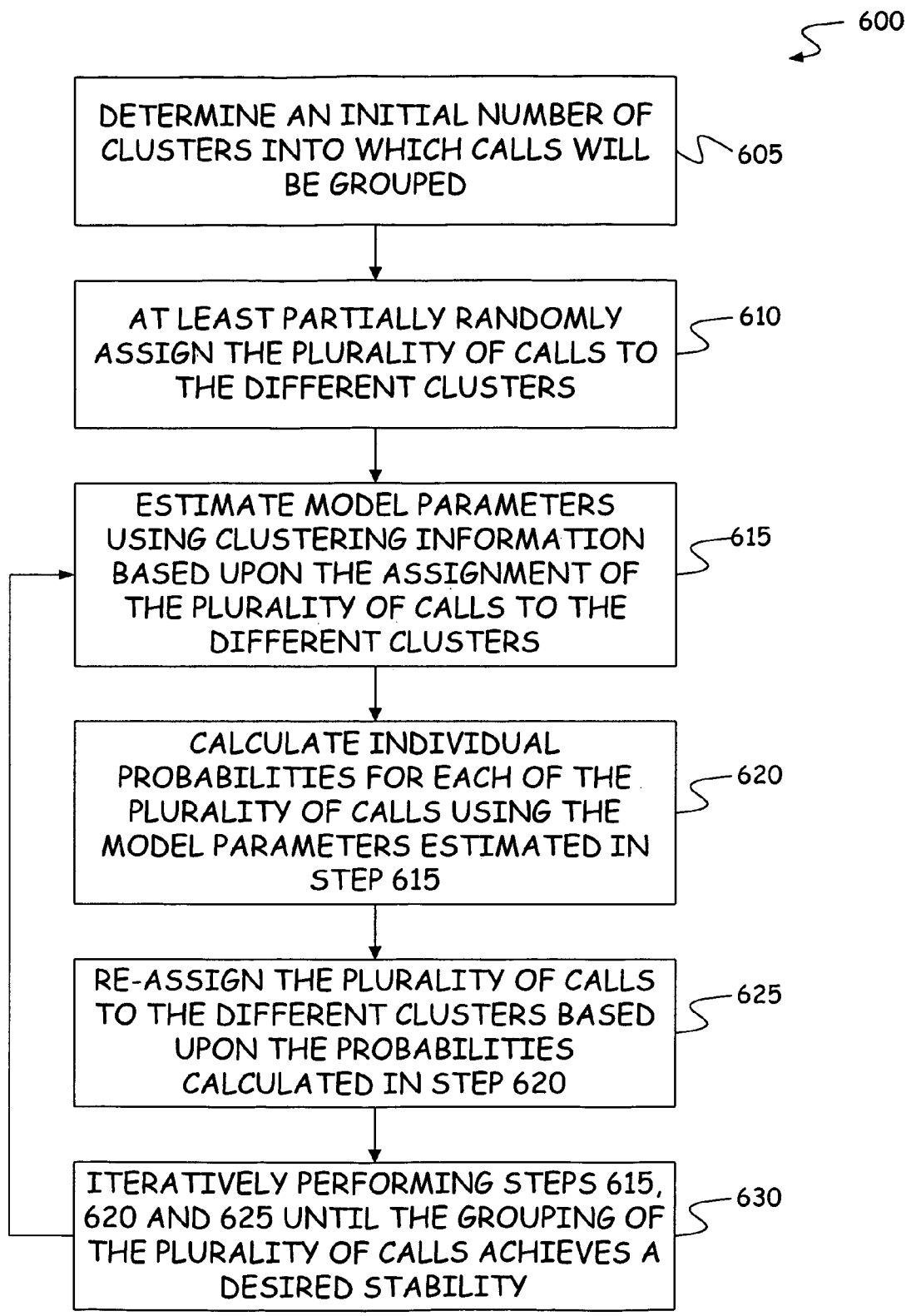
FIG. 10 is a flow diagram illustrating a method in accordance with the present invention.

Specific embodiments of the methods of the present invention have been described in detail above, along with more general embodiments. These more general embodiments can be illustrated, by way of example, in the flow diagrams shown in FIGS. 10 and 11. Referring first to flow diagram 600 shown in FIG. 10, a method of aiding a speech recognition program developer by grouping calls passing through an identified question-answer (QA) state or transition into clusters based on causes of problems associated with the calls is provided. As illustrated the method includes the step 605 of determining a number of clusters into which a plurality of calls will be grouped. At step 610, the plurality of calls are at least partially randomly assigned to the different clusters. At step 615, model parameters are estimated using clustering information based upon the assignment of the plurality of calls to the different clusters. At step 620, individual probabilities are calculated for each of the plurality of calls using the model parameters estimated in step 615, with each of the individual probabilities being indicative of a likelihood that the corresponding call belongs to a particular cluster. At step 625, the plurality of calls are re-assigned to the different clusters based upon the probabilities calculated in step 620. As reflected at 630, steps 615, 620 and 625 are iteratively performed until the grouping of the plurality of calls achieves a desired stability. More specific implementation details of these steps are as described above.

Figure 11:
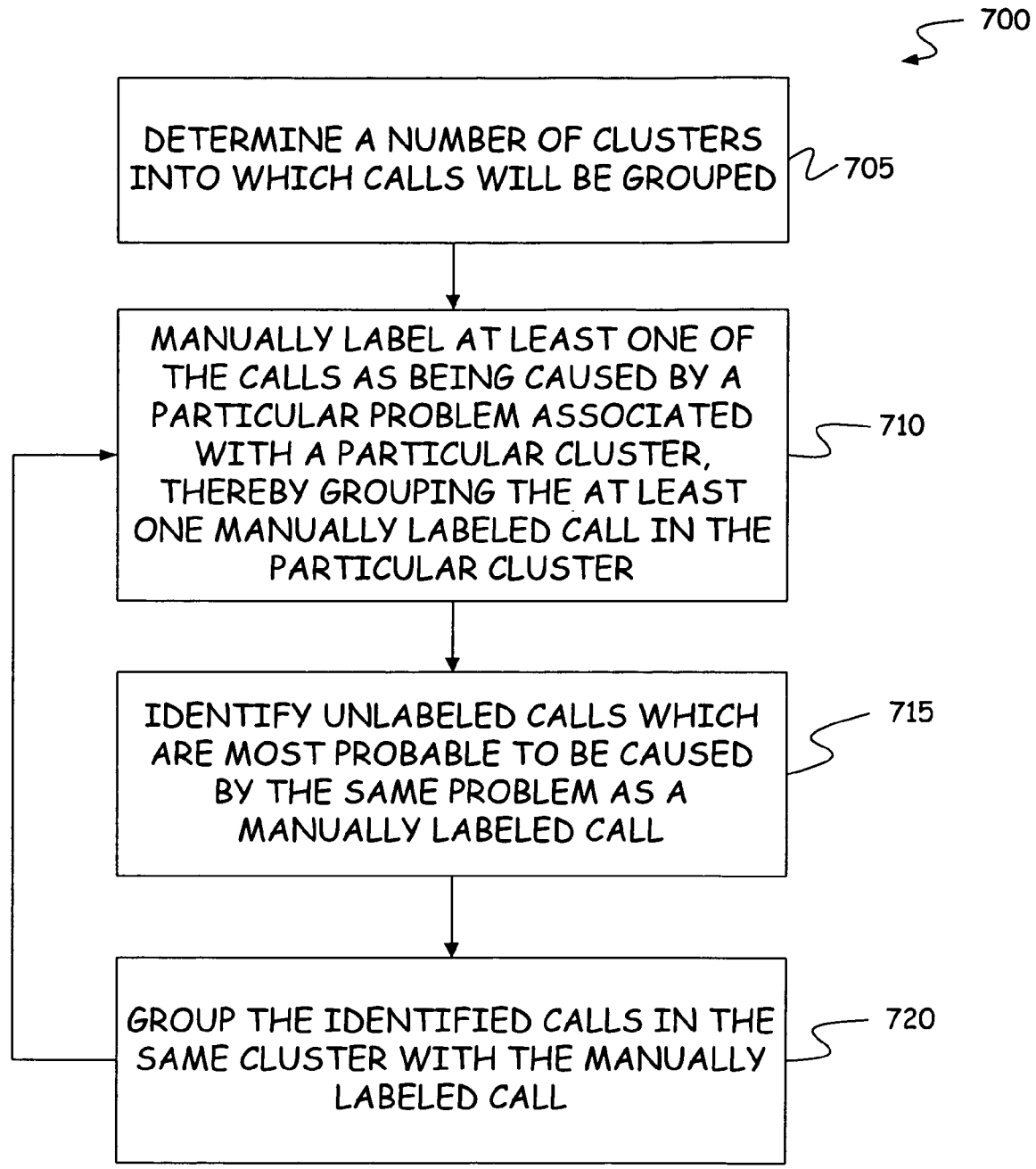
FIG. 11 is a flow diagram illustrating a method in accordance with the present invention.

Referring now to FIG. 11, another illustrative embodiment of the general method of the present invention is illustrated in flow diagram 700 shown in FIG. 11. As illustrated, the method of grouping calls passing through an identified QA state or transition into clusters based on causes of problems associated with the calls includes step 705 of determining a number of clusters into which a plurality of calls will be grouped. Then, at step 710, the method includes manually labeling at least one of the plurality of calls as being caused by a particular problem associated with a particular cluster, thereby grouping the at least one manually labeled call in the particular cluster. As illustrated at step 715, the method next includes identifying unlabeled calls in the plurality of calls which are most probable to be caused by the same problem as a manually labeled call. Then as illustrated at 720, the method includes the step of grouping the identified calls in the same cluster with the manually labeled call. Steps 710, 715 and 720 can then be iteratively performed until the grouping of the plurality of calls achieves a desired stability.

Although the present invention has been described with reference to particular embodiments, workers skilled in the art will recognize that changes may be made in form and detail without departing from the spirit and scope of the invention.

What is claimed is:

1. A computer implemented method of aiding a speech recognition program developer by grouping calls passing through a question-answer (QA) state or transition into clusters based on causes of problems, incurred by a speech application in performing speech tasks, associated with the calls, the method comprising:

(a.1) accessing logged data indicative of a plurality of calls interacting with the speech application and indicative of QA states or transitions through which the calls passed during the interaction;

(a.2) estimating an importance of each given QA state or transition using an importance measure indicative of a success rate of the speech application in performing the speech tasks if calls passing through the given QA state or transition pass instead through another QA state or transition;

(a.3) identifying a set of most important QA states or transitions based on the importance measure;

(a.4) selecting a QA state or transition in the set of most important QA states or transitions;

(a) determining a number of clusters into which a plurality of calls passing through the selected QA state or transition will be grouped;

(b) at least partially randomly assigning the plurality of calls to the different clusters;

(c) utilizing a computer processor that is a functional component of a computer to estimate model parameters using clustering information based upon the assignment of the plurality of calls to the different clusters;

(d) calculating individual probabilities for each of the plurality of calls using the model parameters estimated in step (c), each of the individual probabilities being indicative of a likelihood that the corresponding call belongs to a particular cluster because the corresponding call is associated with a cause of a problem incurred by the speech application that is associated with the particular cluster;

(e) re-assigning the plurality of calls to the different clusters based upon the probabilities calculated in step (d);

(f) iteratively performing steps (c), (d) and (e) until the grouping of the plurality of calls achieves a desired stability;

(g) identifying the causes of the problems based upon the grouping of the plurality of calls once the grouping has achieved the desired stability; and (h) repeating steps (a.3), (a), (b), (c), (d), (e), (f), and (g) for each QA state or transition in the set of most important QA states or transitions.

2. The method of claim 1, wherein in at least one iteration, step (d) further comprises the steps:

manually labeling at least one of the plurality of calls as being caused by a particular one of the problems, incurred by the speech application, associated with a particular cluster; and artificially boosting a probability for each manually labeled call to increase the likelihood that the manually labeled call belongs to the particular cluster.

3. The method of claim 2, wherein in the at least one iteration, step (d) further comprises assigning the manually labeled call to the particular cluster.

4. The method of claim 3, wherein step (b) of at least partially randomly assigning the plurality of calls to the different clusters further comprises initially assigning at least some of the plurality of calls based on prior knowledge using a pre-trained classifier.

5. The method of claim 3, wherein step (b) of at least partially randomly assigning the plurality of calls to different clusters further comprises, if no prior knowledge is available, either initially keeping all of the plurality of calls in a single cluster or initially assigning the plurality of calls to different clusters using unsupervised clustering.

6. A computer implemented method of aiding a speech recognition program developer by grouping calls passing through an identified question-answer (QA) state or transition into clusters based on causes of problems associated with the calls, the method comprising:

(a1) accessing logged call data indicative of a plurality of calls passing through QA states or transitions to estimate a set of most important QA states or transitions based on an importance measure calculated for each of the QA states or transitions;

(a2) selecting a QA state or transition from the set of most important states or transitions;

(a) determining a number of clusters into which a plurality of calls that pass through the selected QA state or transition will be grouped;

(b) at least partially randomly assigning the plurality of calls to the different clusters;

(c) utilizing a computer processor that is a functional component of a computer to estimate model parameters using clustering information based upon the assignment of the plurality of calls to the different clusters;

(d) calculating the individual probabilities for each of the plurality of calls using the model parameters estimated in step (c), each of the individual probabilities being indicative of a likelihood that the corresponding call belongs to a particular cluster, wherein the probabilities are calculated using a relationship that is represented using the equation:

$$p(c_j | x_i, \lambda) = \frac{p(c_j | \lambda)p(x_i | c_j, \lambda)}{\sum_{j'=1}^{J} p(c_{j'} | \lambda)p(x_i | c_{j'}, \lambda)}$$

where $X=\{x_i | i=1, \ldots, I\}$ represents a data set defining the plurality of calls, $C=\{c_j | j=1, \ldots, J\}$ represents a set of J clusters, $\lambda$ represents the estimated model parameters, $p(x_i | c_j, \lambda)$ is a probability a call xi belongs in a class cj and $p(c_j | \lambda)$ is the prior of different classes;

(e) re-assigning the plurality of calls to the different clusters based upon the probabilities calculated in step (d); and (f) iteratively performing steps (c), (d), and (e) until the grouping of the plurality of calls achieves a desired stability, wherein in at least one iteration, step (d) further comprises the steps:

manually labeling at least one of the plurality of calls as being caused by a particular problem associated with a particular cluster;

artificially boosting a probability for each manually labeled call to increase the likelihood that the manually labeled call belongs to the particular cluster; and assigning the manually labeled call to the particular cluster.

7. The method of claim 6, wherein step (c) of estimating model parameters further comprises estimating the model parameters using an expectation maximization algorithm which begins with a set of initial values of the model parameters, and then iterates between an expectation step and a maximization step until the model parameter values converge to stable values.

8. The method of claim 7, wherein in the maximization step, given current model parameters $\lambda$, new model parameters $\lambda'$ are estimated to maximize a function $Q(\lambda',\lambda)$ that is represented using the equation $$Q(\lambda', \lambda) = E(p(\lambda' | X))$$
$$= \sum_{i=1}^{I} \sum_{j=1}^{J} p(c_j | x_i, \lambda)[\log p(X | \lambda') + \log p(\lambda')].$$

9. The method of claim 8, wherein each model parameter is an ordered vector of K attribute values $x_i=\{x_{ik} | k=1, \ldots K\}$, wherein attributes are independent of each other such that:

$$p(x_i | c_j, \lambda) = \Pi_{k=1}^{K} p(x_{ik} | c_j, \lambda),$$

wherein each attribute has either nominal values or real values, with multinomial value attributes modeled with Bernoulli distribution: $\lambda_{jk}=\{q_{jk1}, \ldots, q_{jkL_k}\}$ and real value attributes modeled with Gaussian distribution: $\lambda_{jk}=\{\mu_{jk}, \sigma_{jk}\}$.

10. The method of claim 9, wherein in maximizing the Q function $Q(\lambda',\lambda)$ with respect to each subset of parameters, an algorithm to update a parameter $\pi'_j$, for prior of class distribution, is defined using the relationship represented in the equation:

$$\pi'_j = \frac{\sum_{i=1}^{I} p(c_j|x_i, \lambda) + 1/J}{\sum_{j'=1}^{J}\sum_{i=1}^{I} p(c_{j'}|x_i, \lambda) + 1}.$$

11. The method of claim 9, wherein in maximizing the Q function $Q(\lambda',\lambda)$ with respect to each subset of parameters, an algorithm to update multinomial parameters $q_{jkl}'$, for Bernoulli distribution, is defined using the relationship represented in the equation:

$$q'_{jkl} = \frac{\sum_{i=1}^{I} p(c_j|x_i, \lambda)\delta(x_{ik}, l) + 1/L_k}{\sum_{j'=1}^{J}\sum_{i=1}^{I} p(c_{j'}|x_i, \lambda)\delta(x_{ik}, l) + 1}$$

where:

$$\delta(x, v) = \begin{cases} 1, & \text{if } x = v \\ 0, & \text{otherwise.} \end{cases}$$

12. The method of claim 9, wherein in maximizing the Q function $Q(\lambda',\lambda)$ with respect to each subset of parameters, an algorithm to update Gaussian parameters $\mu'_{jk}$ and $\sigma'_{jk}$ is defined using the relationships represented in the equations:

$$\mu'_{jk} = \frac{\sum_{i=1}^{I} p(c_j|x_i, \lambda)x_{ik}}{\sum_{j'=1}^{J}\sum_{i=1}^{I} p(c_{j'}|x_i, \lambda)x_{ik}}; \text{ and}$$

$$\sigma'_{jk} = \frac{\sum_{i=1}^{I} p(c_j|x_i, \lambda)(x_{ik} - \mu'_{jk})}{\sum_{j'=1}^{J}\sum_{i=1}^{I} p(c_{j'}|x_i, \lambda) + 1}.$$

13. A tangible computer storage medium having stored thereon computer-executable instructions for performing a computer implemented method of aiding a speech recognition program developer by grouping calls passing through an identified question-answer (QA) state or transition into clusters based on causes of problems, encountered by the speech recognition program, associated with the calls, the method comprising:
(a1) calculating an importance measure for each of a plurality of QA states or transitions in the speech recognition program, to identify a set of most important QA states or transitions, by accessing call log data indicative of calls passing through the plurality of QA states or transitions;
(a2) for each of the QA states or transitions in the set of most important QA states or transitions, performing steps (a)-(f) as follows:
(a) determining a number of clusters into which a plurality of calls will be grouped;
(b) at least partially randomly assigning the plurality of calls to the different clusters;
(c) utilizing a computer processor that is a functional component of a computer to estimate model parameters using clustering information based upon the assignment of the plurality of calls to the different clusters;
(d) calculating individual probabilities for each of the plurality of calls using the model parameters estimated in step (c), each of the individual probabilities being indicative of a likelihood that the corresponding call belongs to a particular cluster, wherein the probabilities are calculated using a relationship which is represented using the equation:

$$p(c_j|x_i, \lambda) = \frac{p(c_j|\lambda)p(x_i|c_j, \lambda)}{\sum_{j'=1}^{J} p(c_{j'}|\lambda)p(x_i|c_{j'}, \lambda)}$$

where $X=\{x_i|i=1, \ldots, I\}$ represents a data set defining the plurality of calls, $C=\{c_j|j=1, \ldots, J\}$ represents a set of J clusters, $\lambda$ represents the estimated model parameters, $p(x_i|c_j,\lambda)$ is a probability that a call xi belongs in a class cj and $p(c_j|\lambda)$ is the prior of different classes;
wherein in at least one iteration, step (d) further comprises the steps:
manually labeling at least one of the plurality of calls as being caused by a particular problem associated with a particular cluster; and
artificially boosting a probability for each manually labeled call to increase the likelihood that the manually labeled call belongs to the particular cluster;
(e) re-assigning the plurality of calls to the different clusters based upon the probabilities calculated in step (d); and
(f) iteratively performing steps (c), (d) and (e) until the grouping of the plurality of calls achieves a desired stability.

14. The tangible computer storage medium of claim 13, wherein step (b) of at least partially randomly assigning the plurality of calls to different clusters further comprises, if no prior knowledge is available, either initially keeping all of the plurality of calls in a single cluster or initially assigning the plurality of calls to different clusters using unsupervised clustering.

15. The tangible computer storage medium of claim 13, wherein step (c) of estimating model parameters further comprises estimating the model parameters using an expectation maximization algorithm which begins with a set of initial values of the model parameters, and then iterates between an expectation step and a maximization step until the model parameter values converge to stable values.

16. The tangible computer storage medium of claim 15, wherein in the maximization step, given current model parameters λ, new model parameters λ' are estimated to maximize a function Q(λ',λ) which is represented using the equation $$Q(\lambda', \lambda) = E(p(\lambda' \mid X)) = \sum_{i=1}^{I} \sum_{j=1}^{J} p(c_j \mid x_i, \lambda)[\log p(X \mid \lambda') + \log p(\lambda')].$$

17. The tangible computer storage medium of claim 16, wherein each model parameter is an ordered vector of K attribute values $x_i = \{x_{ik} | k=1, \ldots K\}$, wherein attributes are independent of each other such that:

$$p(x_i|c_j,\lambda) = \Pi_{k=1}^{K} p(x_{ik}|c_j,\lambda),$$

wherein each attribute has either nominal values or real values, with multinomial value attributes modeled with Bernoulli distribution: $\lambda_{jk} = \{q_{jk1}, \ldots, q_{jkL_k}\}$ and real value attributes modeled with Gaussian distribution: $\lambda_{jk} = \{\mu_{jk}, \sigma_{jk}\}$.

18. The tangible computer storage medium of claim 17, wherein in maximizing the Q function Q(λ',λ) with respect to each subset of parameters, an algorithm to update a parameter $\pi'_j$, for prior of class distribution, is defined using the relationship represented in the equation:

$$\pi'_j = \frac{\sum_{i=1}^{I} p(c_j \mid x_i, \lambda) + 1/J}{\sum_{j'=1}^{J} \sum_{i=1}^{I} p(c_{j'} \mid x_i, \lambda) + 1}.$$

* * * * *

UNITED STATES PATENT AND TRADEMARK OFFICE
CERTIFICATE OF CORRECTION

| | |
|---|---|
| PATENT NO. | : 8,099,279 B2 |
| APPLICATION NO. | : 11/054301 |
| DATED | : January 17, 2012 |
| INVENTOR(S) | : Alejandro Acero et al. |

It is certified that error appears in the above-identified patent and that said Letters Patent is hereby corrected as shown below:

In column 18, line 27, in Claim 6, after "probability" insert -- that --.

In column 21, line 6, in Claim 16, delete "$Q(\lambda, \lambda) = E(p(\lambda' | X))$" and insert -- $Q(\lambda', \lambda) = E(p(\lambda' | X))$ --, therefor.

Signed and Sealed this
Thirteenth Day of March, 2012

David J. Kappos
*Director of the United States Patent and Trademark Office*